(12) United States Patent
Grubb

(10) Patent No.: US 7,094,018 B2
(45) Date of Patent: Aug. 22, 2006

(54) WIND POWER GENERATOR

(76) Inventor: Kelly W. Grubb, 109 Kingston Drive, Red Deer, Alberta (CA) T4P-3S4

( * ) Notice: Subject to any disclaimer, the term of this patent is extended or adjusted under 35 U.S.C. 154(b) by 220 days.

(21) Appl. No.: 10/840,475

(22) Filed: May 7, 2004

(65) Prior Publication Data

US 2005/0249579 A1   Nov. 10, 2005

(51) Int. Cl.
    *F03D 7/02* (2006.01)
(52) U.S. Cl. ................. 415/4.3; 415/4.5; 415/219.1; 415/908
(58) Field of Classification Search ............. 415/4.1, 415/4.3, 4.5, 213.1, 219.1, 222, 227, 908
    See application file for complete search history.

(56) References Cited

U.S. PATENT DOCUMENTS

| 1,123,491 | A |   | 1/1915  | Corbin |
| 1,381,712 | A |   | 6/1921  | Kunkel |
| 2,128,592 | A |   | 8/1938  | Mushkin |
| 3,874,816 | A |   | 4/1975  | Sweeney |
| 4,021,135 | A | * | 5/1977  | Pedersen et al. .......... 415/208.2 |
| 4,031,405 | A |   | 6/1977  | Asperger |
| 4,075,500 | A | * | 2/1978  | Oman et al. .................. 290/55 |
| 4,218,175 | A | * | 8/1980  | Carpenter ................ 415/219.1 |
| 5,457,346 | A |   | 10/1995 | Blumberg et al. |
| 5,982,046 | A |   | 11/1999 | Minh |

FOREIGN PATENT DOCUMENTS

| CA | 1109800 A1 | 9/1981 |
| CA | 1238582 A1 | 6/1988 |
| GB | 1474295 A  | 5/1977 |

* cited by examiner

*Primary Examiner*—Edward K. Look
*Assistant Examiner*—Dwayne J White
(74) *Attorney, Agent, or Firm*—Donald R. Schoonover

(57) ABSTRACT

A wind power generator has an arcuate converging-diverging flow passage and a support body that is prolate in shape and is located in the flow passage. The support body is rotatably supported and a plurality of rotor blades are mounted on the support body. The support body and the flow passage define a converging-diverging flow area through which wind passes to drive the support body via the rotor blades.

2 Claims, 1 Drawing Sheet

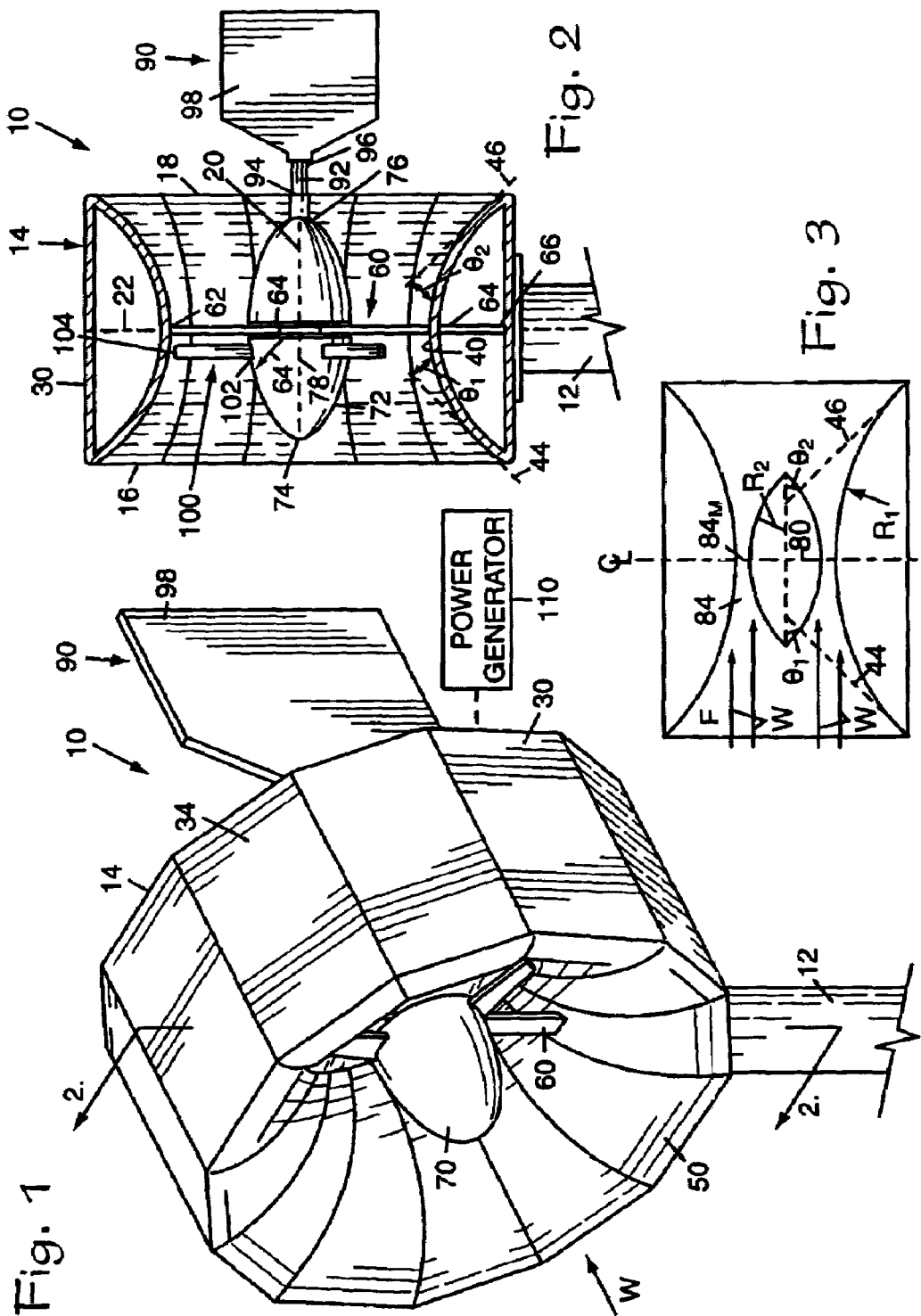

WIND POWER GENERATOR

BACKGROUND OF THE INVENTION

1. Field of the Invention

The present invention relates to the general art of power generation, and to the particular field of wind power generators.

2. Discussion of the Related Art

Wind power generators have been known for centuries. Windmills have been used to operate machinery, produce power and the like for many years.

Recently, interest in wind power generators has increased because wind is a cheap natural resource. Therefore, the technology associated with wind power generators has developed many systems that are more effective in producing power than the windmills of past generations.

It is well understood that the amount of power that a wind power generator using a propeller can generate is proportional to the velocity of the wind flowing past the propeller. In fact, some relationships make this proportionality a cube of the wind velocity.

Therefore, there is a need for a wind power generator which increases the velocity of air passing a propeller of the wind power generator.

The air flowing through the wind power generator should not create turbulence as it flows through the device. Such turbulence may decrease the efficiency of the generator. Many known wind power generators have elements that may create turbulence in the fluid flowing through the device.

Therefore, there is a need for a wind power generator which increases the velocity of air passing a propeller of the wind power generator without creating an undue amount of turbulence in the flowing fluid.

PRINCIPAL OBJECTS OF THE INVENTION

It is a main object of the present invention to provide a wind power generator which increases the velocity of air passing a propeller of the wind power generator.

It is another object of the present invention to provide a wind power generator which increases the velocity of air passing a propeller of the wind power generator without creating an undue amount of turbulence in the flowing fluid.

SUMMARY OF THE INVENTION

These, and other, objects are achieved by a wind power generator which includes a converging-diverging shape adjacent to the blades of the generator with the blades being located adjacent to the throat area of the converging-diverging shape. The blades are mounted on a solid that is in the shape of a prolate spheroid and are located on the center plane of that body. The converging-diverging shape is defined by a wall that is elliptical shaped in cross section and which has a center plane located at the center plane of the spheroid.

The wind power generator embodying the present invention makes maximum use of any wind flowing through the generator and has the rotor blades to be located at the location of maximum efficiency for the fluid flowing through the generator. In this manner, the overall efficiency of the wind power generator is maximized. Furthermore, the wind power generator embodying the present invention is easy to assemble and thus is cost effective and does not create an undue amount of turbulence in the fluid flowing therethrough.

BRIEF DESCRIPTION OF THE DRAWING FIGURES

FIG. 1 is a perspective view of a wind power generator embodying the present invention.

FIG. 2 is an elevational view taken along line 2—2 of FIG. 1.

FIG. 3 is a cross sectional view showing the converging-diverging shape of the wind power generator embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a wind power generator 10. Power generator 10 comprises a support element 12, such as a support post or the like, that is mounted on a support surface such as the ground and which extends upwardly therefrom.

An outer casing 14 is mounted on the support element 12 to be exposed to wind W flowing toward generator 10. Outer casing 14 has a first end 16 which is a fluid inlet end when the outer casing 14 is in use as shown in FIG. 1, a second end 18 which is an outlet end when the outer casing 14 is in use, a central axis 20 which extends between the first end 16 and the second end 18, and a central plane 22 which is located midway between the first end 16 of the outer casing 14 and the second end 18 of the outer casing 14 and which extends perpendicular to the central axis 20.

Outer casing 14 further includes an outer surface 30 which is circular in shape with a plurality of planar facets, such as planar facet 34, thereon. The facets extend in the direction of the central axis 20 of the outer casing 14. Outer casing 14 further includes an inner surface 40. Inner surface 40 is arcuate in shape and is oriented to be convex with respect to the central axis 20 of the outer casing 14. Inner surface 40 has a single radius of curvature $R_1$ and is smoothly curved between the first end 16 of the outer casing 14 and the second end 18 of the outer casing 14. The curvature of the inner surface 40 is shaped to define a flow area F which steadily and smoothly decreases from the first end 16 of the outer casing 14 to the central plane 22 of the outer casing 14 and then steadily and smoothly increases from the central plane 22 of the outer casing 14 to the second end 18 of the outer casing 14. The inner surface 40 is shaped such that a line 44 tangent to the inner surface 40 at the first end 16 of the outer casing 14 is oriented at an angle $\theta_1$ which is 45° with respect to the central axis 20 of the outer casing 14, and a line 46 tangent to the inner surface 40 at the second end 18 of the outer casing 14 is oriented at an angle $\theta_2$ which is 45° to the central axis 20 of the outer casing 14 whereby the flow area defined by the inner surface 40 converges between the first end 16 of the outer casing 14 and the central plane 22 and then diverges between the central plane 22 to the second end 18 of the outer casing 14.

In one form of the generator, the inner surface 40 of the outer casing 14 includes a plurality of sections, such as section 50. Each section 50 extends between the first end 16 of the outer casing 14 and the second end 18 of the outer casing 14.

A plurality of support struts, such as support strut 60, are also included in generator 10. Each support strut 60 has a first end 62 and is fixed to the inner surface 40 of the outer casing 14 adjacent to the first end 16 and a second end 64 that is located adjacent to the central axis 20 of the outer casing 14. The support struts 60 are located at the central plane 22 of the outer casing 14. At least one support strut 64 of the plurality of support struts has a first end 66 fixed to the outer casing 14.

A support body 70 is rotatably mounted on the support struts 60 adjacent to the second end 64 of each support strut 60. The support body 70 has an arcuate outer surface 72 that is prolate in shape and which has a single radius of curvature $R_2$. The support body 70 has a first end 74, which is located adjacent to the first end 16 of the outer casing 14, and a second end 76, which is located adjacent to the second end of the outer casing 14. The support body 70 further includes a long axis 78 that extends between the first end 74 of the support body 70 and the second end 76 of the support body 70 and is co-linear with the central axis 20 of the outer casing 14. The support body 70 further includes a small axis 80 that is oriented perpendicular to the long axis 78 of the support body 70 and is located adjacent to the central plane 22. The small axis 80 is spaced apart from the central plane 22 towards the first end 16 of the outer casing 14. The struts are rotatably connected to the support body 70 adjacent to the small axis 80 of the support body 70 and are spaced apart from the small axis 80 in the direction of the second end 18 of the outer casing 14. The support body 70 is spaced apart from the inner surface 40 of the outer casing 14. The support body 70 and the inner surface 40 of the outer casing 14 define a flow passage 84 which smoothly converges between the first end 74 of the support body 70 and the central axis 20 of the outer casing 14 and then smoothly diverges between the central axis 20 and the second end 76 of the support body 70 with the flow passage 84 being sized to be a minimum flow area $84_M$ at the central axis 20 of the outer casing 14.

A control rudder 90 is mounted on the second end 76 of the support body 70. The control rudder 90 includes a support rod 92 which has a first end 94 fixed to the second end 76 of the support body 70 and a second end 96 that is spaced apart from the second end 76 of the support body 70. The support rod 92 is co-linear with the central axis 20 of the outer casing 14. A control tail 98 is mounted on the second end 96 of the support rod 92.

A plurality of rotor blades, such as rotor blade 100, are mounted on the support body 70. Each rotor blade 100 has a first end 102 that is fixedly mounted on the support body 70 adjacent to the small axis 80 of the support body 70 and a second end 104 that is spaced apart from the support body 70 and is also spaced apart from the inner surface 40 of the outer casing 14. The rotor blades 100 extend radially outward from the support body 70 and are spaced apart from the small axis 80 of the support body 70 in the direction of the first end 74 of the support body 70 to be located between the small axis 80 of the support body 70 and the first end 74 of the support body 70.

A power generator 110 is connected to the support body 70 and converts rotational movement of the support body 70 into power.

Since the air flow associated with power generator 10 is subsonic, as air flows through the generator 10, the velocity of the air flow continues to increase up to the throat section, which is central plane 22. This accelerating fluid is used to rotate the rotor blades 100 in a manner that is much more efficient than rotor blades that are not located inside a converging-diverging flow path. As discussed above, since power output of a wind generator depends on the flow velocity of fluid flowing past the rotor blades, this increase in flow velocity attributed to the shape of the flow passage will increase the power output of the generator over other generators that do not have such a flow shape. The smooth surface and smooth curve of the inner surface 40 reduces turbulence as the fluid flows through the flow path.

It is understood that while certain forms of the present invention have been illustrated and described herein, it is not to be limited to the specific forms or arrangements of parts described and shown.

What is desired to be secured by Letters Patent is:

1. A wind power generator comprising:
   a) a support element;
   b) an outer casing mounted on said support element, said outer casing having a first end which is a fluid inlet end when said outer casing is in use, a second end which is an outlet end when said outer casing is in use, a central axis extending between the first end and the second end, and a central plane located midway between the first end of said outer casing and the second end of said outer casing and extending perpendicular to the central axis, said outer casing further including
      (1) an outer surface, the outer surface being circular in shape with a plurality of planar facets thereon, the facets extending in the direction of the central axis of said outer casing, and
      (2) an inner surface, the inner surface being arcuate in shape and being oriented to be convex with respect to the central axis of said outer casing, the inner surface having a single radius of curvature and being smoothly curved between the first end of said outer casing and the second end of said outer casing, the curvature of the inner surface being shaped to define a flow area with the flow area steadily and smoothly decreasing from the first end of said outer casing to the central plane of said outer casing and then steadily and smoothly increasing from the central plane of said outer casing to the second end of said outer casing, the inner surface being shaped such that a line tangent to the inner surface at the first end of said outer casing is oriented at 45° with respect to the central axis of said outer casing and a line tangent to the inner surface at the second end of said outer casing is oriented at 45° to the central axis of said outer casing whereby the flow area defined by the inner surface converges between the first end of said outer casing and the central plane and then diverges between the central plane to the second end of said outer casing;
   c) a plurality of support struts having a first end and being fixed to the inner surface of said outer casing adjacent to the first end and a second end located adjacent to the central axis of said outer casing, said support struts being located at the central plane of said outer casing, at least one support strut of said plurality of support struts having a first end fixed to said outer casing;
   d) a support body rotatably mounted on said support struts adjacent to the second end of each support strut, said support body having an arcuate outer surface that is prolate in the shape and which has a single radius of curvature, said support body having a first end which is located adjacent to the first end of said outer casing and a second end which is located adjacent to the second end of said outer casing, said support body further including a long axis that extends between the first end of said support body and the second end of said support body and is co-linear with the central axis of said outer casing, said support body further including a small axis that is oriented perpendicular to the long axis of said support body and is located adjacent to the central plane, the small axis being spaced apart from the central plane towards the first end of said outer casing, said struts being rotatably connected to said support body adjacent to the small axis of said support body and spaced apart from the small axis in the direction of the second end of said outer casing, the support body being spaced apart from the inner surface of outer casing, the support body and the inner surface of said outer casing defining a flow passage which smoothly converges between the first end of said support body and the central axis of said outer casing and then smoothly diverges between the central axis and the second end of said support body with the flow passage being sized to be a minimum flow area at the central axis of said outer casing;

e) a control rudder mounted on the second end of said support body, said control rudder including
   (1) a support rod having a first end fixed to the second end of said support body and a second end spaced apart from the second end of said support body, the support rod being co-linear with the central axis of said outer casing, and
   (2) a control tail mounted on the second end of said support rod;

f) a plurality of rotor blades mounted on said support body, each rotor blade of said plurality of rotor blades having a first end fixedly mounted on said support body adjacent to the small axis of said support body and a second end spaced apart from said support body and spaced apart from the inner surface of said outer casing, said rotor blades extending radially outward from said support body and being spaced apart from the small axis of said support body in the direction of the first end of said support body to be located between the small axis of said support body and the first end of said support body; and g) a power generator connected to said support body and converting rotational movement of said support body into power.

2. The wind power generator as described in claim 1 wherein the inner surface of said outer casing includes a plurality of sections with each section extending between the first end of said outer casing and the second end of said outer casing.

* * * * *